Patented Apr. 17, 1951

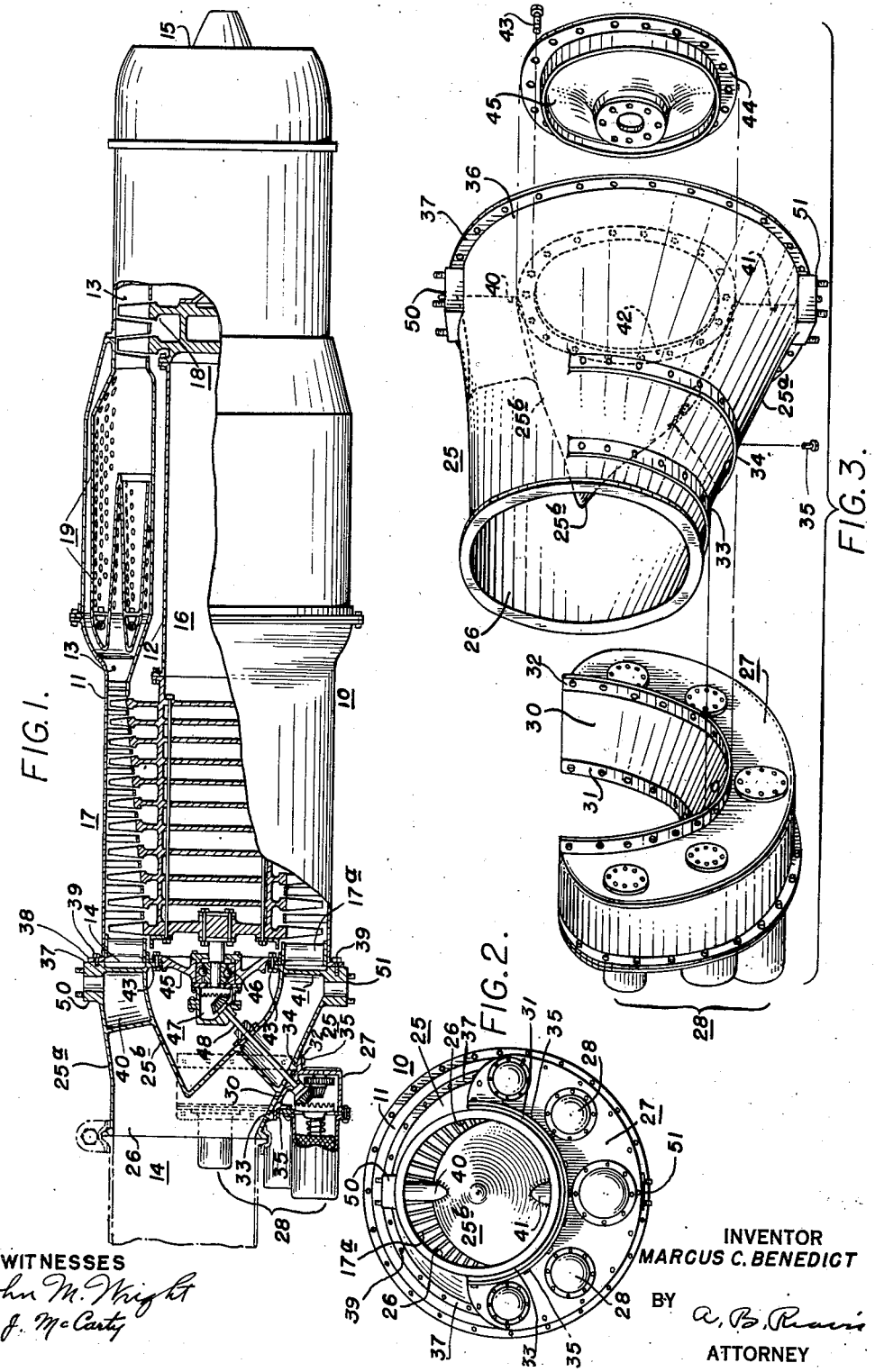

2,548,858

UNITED STATES PATENT OFFICE 2,548,858

GAS TURBINE APPARATUS

Marcus C. Benedict, Springfield, Pa., assignor to Westinghouse Electric Corporation, East Pittsburgh, Pa., a corporation of Pennsylvania Application June 24, 1949, Serial No. 101,190

2 Claims. (Cl. 230—122)

This invention relates to gas turbine power plants, and more particularly, to an aviation gas turbine engine equipped with engine operative auxiliaries, such as a starter, fuel governor, lubrication pumps and the like.

It has been proposed to mount such auxiliary accessories and control devices on a gear box carried on the outside wall of the engine casing or envelope, and to connect the operating elements of the devices to the rotor of the engine through the medium of suitable gearing and radially disposed shafts. With the accessories thus carried laterally on the engine envelope, however, as much as fifty per cent may be added to the frontal area presented by the basic power plant, rendering difficult the mounting of the engine in an aircraft in a manner minimizing drag at high speeds. In a well known alternative construction the engine accessories may be mounted in the nose portion of the power plant within an enlarged fairing or cowl structure, thus reducing the frontal area, but in such case, maintenance of the accessories is rendered more difficult, since access thereto necessitates preliminary removal of a number of layers or sections of the fairing structure.

It is herein proposed to obviate the disadvantages inherent in the foregoing constructions by providing a frontal accessory and gear box assembly which is carried on the forward end of the engine envelope within the maximum diametric extent thereof, the assembly being disposed adjacent an eccentric air inlet duct section through which air is admitted to the compressor.

Another object of the invention is the provision of a gas turbine engine having a casing structure including a forward or No. 1 bearing support section comprising a single eccentric air inlet duct portion, which is sufficiently offset to provide room within the diameter of the engine envelope for the accessory and gear box assembly carried by the section.

A further object is to provide a gear box and engine accessory assembly of arcuate or substantially semi-circular form, and adapted to be mounted adjacent the inlet duct within the normal lateral clearance dimensions of a gas turbine power plant for aircraft.

These and other objects are effected by my invention as will be apparent from the following description and claims taken in connection with the accompanying drawings, forming a part of this application, in which:

Fig. 1 is an elevational view, partly in section, of a gas turbine power plant constructed in accordance with the invention;

Fig. 2 is a frontal view of the power plant shown in Fig. 1; and

Fig. 3 is an exploded perspective view, in enlarged detail, of the gear box, inlet duct and bearing support sections of the apparatus shown in Fig. 1.

Referring to Fig. 1, the typical gas turbine power plant 10 therein illustrated in schematic form comprises an outer substantially tubular casing structure 11 having mounted therein a coaxially arranged core structure indicated generally at 12, forming an annular fluid flow passage 13, which extends axially through the plant from a forwardly-disposed air inlet 14 to a rearwardly-disposed nozzle 15. Suitably journaled within the engine 10 is a rotor indicated generally by the reference character 16, the forward end of which constitutes the rotor of an axial-flow compressor 17, and the rear end of which constitutes the rotor of a turbine 18. Annular combustion apparatus 19 is interposed in the passage 13 between the discharge end of the compressor 17 and the turbine 18. In operation, air entering the compressor by way of the annular inlet 14 is compressed by the compressor 17 and delivered to the combustion apparatus 19, in which fuel is burned to provide motive fluid, which is expanded through the turbine 18 for driving the compressor, and finally exhausted to the atmosphere by way of the nozzle 15, usually in the form of a jet establishing a propulsive thrust.

According to the invention, a frusto-conical air inlet duct or casing section 25 having an eccentric or offset frontal opening 26 is mounted on the engine 10 forwardly of the usual radially-vaned inlet diaphragm 17a of the compressor 17. Supported on the casing section 25 is a gear box 27 carrying an assemblage of accessory devices, which are indicated generally by the reference character 28 and may include suitable lubricant and fuel pumps, starter apparatus, and fuel governor apparatus, all adapted to be operatively connected to the engine through suitable gearing in the gear box. The gear box 27 is generally arcuate in form and may have a casing structure in part integral with the casing section 25, or may constitute an entirely separable structure, as best shown in Fig. 3. An inner curved wall 30 of the gear box 27 is flanked by oppositely-extending arcuate flanges 31 and 32, which are engageable with complementary bolting pads 33 and 34, respectively, formed on the outer wall 25a of the casing section 25. These pads preferably have surfaces parallel with the engine axis, as best shown in Fig. 1, and are apertured to receive suitable means such as bolts 35 for securing the gear box in place.

The outer wall 25a of the casing section 25 is generally frusto-conical with respect to an axis that is somewhat inclined relative to the longitudinal axis of the engine 10, so that the wall is inswept on one side to a greater degree than on the other to provide a forward opening 26 that is eccentric with respect to the larger rear opening 36 thereof. The latter opening is encompassed by an annular flange 37 which is engageable with a similar flange 38 carried by the outer casing structure 11. As shown in Fig. 1, the flanges 37 and 38 are secured together by suitable means such as bolts 39. Disposed within the outer wall 25a is a central core or fairing 25b of generally conical form, which is carried therein on radially arranged hollow struts 40 and 41, and terminates in an annular flange 42 (see Fig. 3) which is secured by bolts 43 to the peripheral flange 44 of a central bearing support member or disc 45. As shown in Fig. 1, the bearing support member 45 is adapted to carry the forward or thrust bearing assembly 46 of the rotor 16, and also supports a suitable gear assembly 47, which is associated with the upper end of an inclined shaft 48, through the medium of which the rotor is operatively connected to the operating elements in the gear box 27. Suitable engine mounting pads 50 and 51 may be formed diametrically opposite the bearing cone in the casing section 25, as shown in Fig. 1, for facilitating installation of the assembled engine in an aircraft fuselage or wing (not shown).

With the foregoing construction and arrangement of the component elements of the engine 10, it will be apparent that the several accessory or control devices necessarily cooperative with the engine may be readily installed and serviced without necessitating dismantling of the casing structure as a whole, while the space required for such devices is maintained within the outside dimensions of the engine envelope for facilitating the mounting of the power plant in any desired location in the aircraft for which the engine is designed.

While I have shown my invention in but one form, it will be obvious to those skilled in the art that it is not so limited, but is susceptible of various changes and modifications without departing from the spirit thereof.

What I claim is:

1. In a gas turbine power plant including a substantially cylindrical casing structure having an annular air flow passage, and a compressor rotor axially mounted therein for drawing air into said passage, an air inlet casing section comprising an outer generally frusto-conical wall portion complementary to and mounted on said casing structure and an inner fairing portion disposed in spaced relation interiorly of said outer wall portion, said casing section having an eccentric air inlet passage diverging rearwardly into a concentric annular passage communicating with the first-named passage, an arcuate gear box carried on the relatively inswept wall portion of said casing section adjacent said eccentric passage and within the lateral extent of said power plant, a plurality of accessory devices for said power plant mounted on said gear box, and driving means therefor including a shaft operatively connecting said accessory devices to said rotor.

2. In a gas turbine power plant having an axial flow compressor and a substantially cylindrical casing structure providing an axially-concentric air inlet passage for said compressor, the combination of a bearing assembly for the rotor of said compressor, a plurality of engine accessory devices cooperative with said rotor, and means for mounting said bearing and accessory devices within the radial extent of said casing structure comprising a casing section having a substantially frusto-conical outer wall relatively inswept on one side to form an eccentric air inlet passage communicating with said first-named inlet passage, an arcuate gear box assembly operatively supporting said accessory devices and carried on said casing section adjacent said inswept side thereof, a bearing support member mounted in said casing section for retaining said bearing, and transmission means including an inclined shaft disposed in said casing section for operatively connecting said gear box assembly and said rotor adjacent said bearing.

MARCUS C. BENEDICT.

No references cited.